Nov. 17, 1964   C. S. BAILEY ETAL   3,157,357
BY-PASS THERMOSTAT VALVE ARRANGEMENT
Filed Jan. 3, 1962

INVENTORS
Charles S. Bailey &
BY   William J. Orr
George E. Johnson
ATTORNEY ated Nov. 17, 1964

3,157,357
BY-PASS THERMOSTAT VALVE ARRANGEMENT
Charles S. Bailey and William J. Orr, Lockport, N.Y., assignors to General Motors Corporation, Detroit, Mich., a corporation of Delaware
Filed Jan. 3, 1962, Ser. No. 164,116
6 Claims. (Cl. 236—34.5)

This invention relates to thermostats and more particularly to a thermostat valve arrangement for regulating the coolant temperature of an internal combustion engine.

A thermostat valve arrangement controlling a main flow as well as a bypass flow of engine coolant is disclosed in the United States Patent No. 2,165,355, granted July 11, 1939, to John E. Dube. Such a thermostat has certain disadvantages. Some areas of the thermostat parts which are exposed to the coolant are not constant in extent or in effect during a complete cycle of operation of the thermostat. A variation in the exposed areas of the valve and thermostatic element may cause a blow-open condition on the main valve because of the coolant pump pressure. This blow-open condition may greatly delay a subsequent closing of the valve particularly in a high coolant pressure system as commonly used in modern automobiles.

An object of the present invention is to provide an improved thermostat valve arrangement for controlling main and bypass flow with substantial elimination of variation in the extent of areas influential in operating the valve.

To this end, a feature of the present invention is a thermostat valve arrangement including a valve casing adapted to be mounted in a two-way housing for conducting fluid, a main valve being adapted to control flow through one way leading through the housing and a movable portion of a pellet-type motor being arranged not only to operate the main valve but also to control fluid flow through the second way leading through the housing.

These and other important features of the invention will now be described in detail in the specification and then pointed out more particularly in the appended claims.

Figure 1:
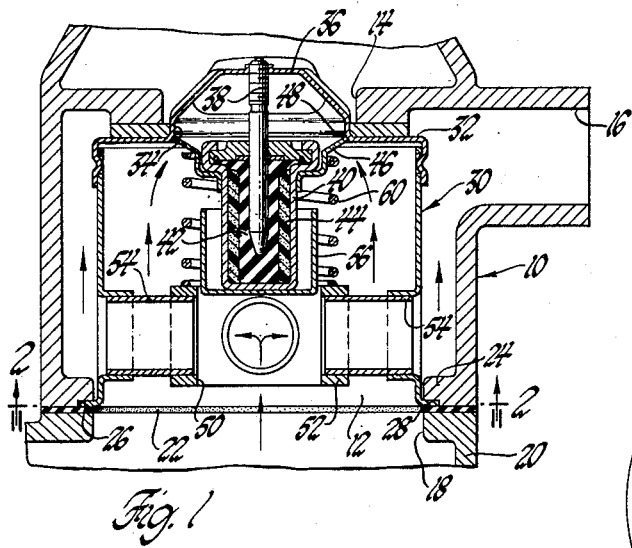
FIGURE 1 is a sectional view through a two-way housing in which a thermostat valve arrangement incorporating the present invention is installed.

In Figure 1, a two-way housing is generally indicated at 10. This housing consists of a bottom portion having an inlet at 12, a main outlet at 14 and a bypass outlet at 16. The housing is so made as to register with the outlet 18 of an engine block a portion of which is shown at 20. A sealing gasket 22 is shown interposed between the engine 20 and the housing 10. The bottom portion of the housing 10 is shown with an inwardly directed annular shoulder 24 in which is formed a recess 26 for the retention of an annular flange 28. This flange is a peripheral portion of a thermostat casing generally indicated at 30.

The casing 30 includes a cover 32 which is apertured to define an outlet opening 34. The cover 32 also has a bridge structure 36 extending across the opening 34 and bearing a pin 38 which depends therefrom and extends downwardly through the port 34 as a fixed part of a pellet type thermosensitive motor into a plug portion 40 or movable part of the motor. This movable part 40 includes a rubber boot 42 surrounding the lower portion of the pin 38 and also a temperature sensitive wax 44 surrounding the boot. Further details regarding this plug 40 and its contents are not given here as they form no part of the present invention. It suffices to say, however, that an increase in temperature would cause expansion of the wax 44 and a withdrawal of the plug 40 from the pin 38 an extent dependent upon the rise in temperature. Such a pellet-type motor is disclosed in the United States Patent 2,881,616, granted April 14, 1959, in the names of H. J. Clifford and A. Schwarz.

The plug 40 is so formed as to carry a valve 46 nested therein in position to register with a seat 48 formed on the casing 30 thereby to control flow through the port 34.

Coaxial with the inlet 12 and the outlet 34 is an intermediate port 50 formed in a somewhat cylindrical center member 52 which is supported by four tubes 54 extending radially and 90 degrees apart to the cylindrical side of the casing 30. A cup-shaped member 56 has its bottom attached to the bottom of the plug 40 and is so arranged as slidably to fit within the port 50 of the central member 52.

A coil spring 60 acts between the top of the central member 52 and the main valve 46 urging the latter toward its closed position with respect to the seat 48.

Assuming that engine coolant is discharged from the engine block 20 by pump action and that the engine is cold, the thermostat valve arrangement will be as shown in FIGURE 1, that is, the main valve 46 will be closed on its seat 48. In such a situation the flow through the housing 10 will be through each of the tubes 54 and back to the pump and engine by way of the bypass discharge outlet 16. When the engine becomes heated the wax 44 will expand and the valve 46 will be forced downwardly against the spring 60 an extent dependent upon the temperature rise. As the valve 46 opens the fluid flow directed upwardly between the tubes 54 and through the outlet 14 will increase and the flow through the outlet 16 will decrease. If the temperature does not rise sufficiently fully to open the main valve 46, the bypass tubes 54 will still take a part of the flow. When the coolant temperature drops the spring 60 will cause the main valve 46 again to close. The function of the cup 56 is to serve as a secondary valve member in throttling the flow through the intermediate opening 50 to the tubes 54.

Figure 2:
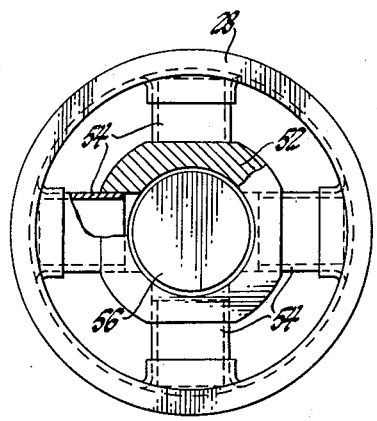
FIGURE 2 is a view partly in section and looking in the direction of the arrows 2—2 in FIGURE 1.
Figure 3:
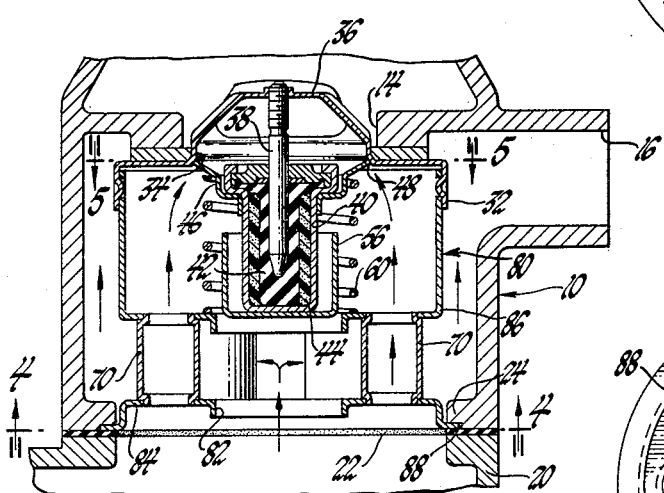
FIGURE 3 is a very similar view to that of FIGURE 1 but showing a modified construction for the thermostat valve arrangement.
Figure 4:
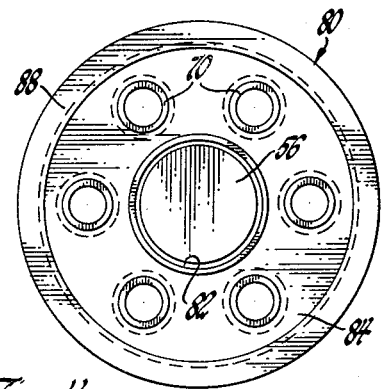
FIGURE 4 is a view looking in the direction of the arrows 4—4 in FIGURE 3.
Figure 5:
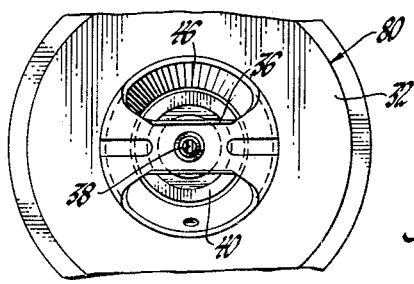
FIGURE 5 is a plan view looking in the direction of the arrows 5—5 in FIGURE 3.

In the modification of FIGURES 3, 4 and 5, similar parts are given the same reference characters as used in FIGURE 1. Six tubes 70 are substituted for the four tubes 54 of FIGURES 1 and 2 and a casing 80 is substituted for the casing 30. Tubes 70 are now arranged to provide for the main flow to the main valve 46 whereas the bypass flow from an intermediate opening 82 is by way of passages extending radially and between the tubes 70. The bypass or radial flow is controlled by throttling action of a cup 56 much as in the modification of FIGURE 1. The casing 80 includes a bottom plate 84 joined to a main portion 86 of the casing by means of the six tubes 70. The plate 84 bears a peripheral mounting flange 88 to function as does the flange 28 in FIGURE 1.

It will be noted that in either construction the effective areas, that is, the valve and power element areas exposed to coolant temperature and pump pressure, remain substantially constant during each complete cycle of operation of the thermostat. This being the case, there is no tendency for the main valve 46 to tend momentarily to remain in any fixed position. With the elimination of a hunting effect accompanying such a tendency a more effective and reliable control of the coolant flow is realized.

We claim:

1. A thermostat valve arrangement adapted to be mounted in a housing having one inlet, one main outlet and one bypass outlet, said valve arrangement having a casing, a peripheral mounting flange and an inlet opening at one end of said casing, an outlet opening at the other end of said casing adapted to lead to said main outlet, said casing defining an intermediate port between said ends and adapted to serve as a bypass leading to said bypass outlet, a pellet-type motor having two relatively movable parts coaxial with said casing outlet opening and intermediate port, one of said motor parts being a pin fixed to said casing, the other of said motor parts being a plug slidable on said pin, a main valve carried by said other motor part and arranged to control said casing outlet opening, a secondary valve member on said other motor part and adapted slidably to fit within said intermediate port, and spring means urging said main valve toward said casing outlet opening.

2. A thermostat valve arrangement comprising a casing, a peripheral mounting flange and an inlet opening at one end of said casing, an outlet opening at the other end of said casing, said casing defining an intermediate port located between said ends and a discharge passage extending radially from said intermediate port, said discharge passage being adapted to serve as a bypass, a pellet-type motor having a pin fixed to said casing and extending through said casing outlet opening, said motor also including a plug slidable on said pin when subjected to a variation in temperature, a main valve carried by said plug and arranged to control said casing outlet opening, said plug being adapted to move into said intermediate part a distance dependent upon temperature, and spring means urging said main valve toward said casing outlet opening.

3. A thermostat valve arrangement comprising a casing, a peripheral mounting flange and an inlet opening at one end of said casing, an outlet opening at the other end of said casing, said casing defining an intermediate port and a radial discharge passage located between said ends, a pellet-type motor having two relatively movable parts coaxial with said casing outlet opening and intermediate port, one of said motor parts being a pin fixed to said casing and extending through said casing outlet opening, the other of said motor parts being a plug slidable on said pin in accordance with temperature and having a diameter less than that of said intermediate port, a main valve carried by said plug and positioned to control said casing outlet opening, spring means urging said main valve toward said outlet opening, and the arrangement being such that an elevation in temperature will cause opening of said casing outlet opening by said main valve and closing of said intermediate port by said plug.

4. A thermostat valve arrangement comprising a casing, a peripheral mounting flange and an inlet opening at one end of said casing, an outlet opening at the other end of said casing, a bridge arranged transverse to said outlet opening, said casing also defining an intermediate port between said ends and in alignment with said outlet opening, means forming a discharge passage extending from said intermediate port and through the wall of said casing, a pellet-type motor having pin and plug structure, said pin being fixed to said bridge, the said plug structure being slidable on said pin and arranged to control said discharge passage, a main valve carried by said plug structure and arranged to control said casing outlet opening, said intermediate port being of a diameter freely to receive said plug structure, and spring means urging said main valve toward the said casing outlet opening.

5. A thermostat valve arrangement comprising a casing, a peripheral mounting flange and means forming an inlet opening at one end of said casing and an outlet opening at the other end of said casing, said casing defining an intermediate port located between said ends, means forming a passage in said casing leading from said intermediate port and through the side of said casing for serving as a bypass of said outlet opening, a pellet-type motor having two relatively moving parts, one of said parts being fixed to said casing and extending through said casing outlet opening, a main valve carried by the other of said motor parts and arranged to control said casing outlet opening, a secondary valve member carried by said other motor part and adapted to enter said intermediate port to control flow through said passage in accordance with temperature, and spring means retained by said casing and urging said main valve toward said casing outlet opening.

6. A thermostat valve arrangement adapted to be mounted in a housing having a bottom inlet, a main outlet and a bypass outlet, said valve arrangement having a casing, a peripheral mounting flange and means forming and inlet opening at the bottom end of said casing, said casing inlet opening being adapted to be connected with said housing bottom inlet, the upper end of said casing defining a main outlet opening, a bridge extending from said casing, said casing defining an intermediate port between said ends and a horizontal discharge passage extending from said intermediate port and adapted to serve as a bypass to said housing bypass outlet, a thermosensitive pellet-type motor having two relatively movable parts coaxial with said casing inlet and outlet openings and said intermediate port, one of said motor parts being a pin fixed to said bridge and extending through said casing outlet opening, the other of said motor parts being a plug structure slidable on said pin, a main valve carried by said plug structure and arranged to control said casing outlet opening, a cylindrical secondary valve member fixed to said plug structure and having a diameter less than that of said intermediate port and arranged to control said horizontal discharge passage and spring means urging said main valve toward the said casing outlet opening.

References Cited in the file of this patent

UNITED STATES PATENTS

| | | |
|---|---|---|
| 2,165,355 | Dube | July 11, 1939 |
| 2,982,477 | Drapeau | May 2, 1961 |

FOREIGN PATENTS

| | | |
|---|---|---|
| 1,035,408 | Germany | July 31, 1958 |